US010818894B2

(12) United States Patent
Paramasivam et al.

(10) Patent No.: US 10,818,894 B2
(45) Date of Patent: Oct. 27, 2020

(54) BATTERY COMPONENT WITH A FLOW PATH

(71) Applicant: Ford Global Technologies, LLC, Dearborn, MI (US)

(72) Inventors: Saravanan Paramasivam, South Lyon, MI (US); Brent Zapczynski, Dearborn, MI (US); Steve Droste, Redford, MI (US); Hari Krishna Addanki, Novi, MI (US); Samir Subba, Dearborn, MI (US); Ali Saad, Troy, MI (US); Michael E. Reibling, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 15/920,564

(22) Filed: Mar. 14, 2018

(65) Prior Publication Data

US 2019/0140227 A1 May 9, 2019

Related U.S. Application Data

(60) Provisional application No. 62/582,540, filed on Nov. 7, 2017.

(51) Int. Cl.
*H01M 2/10* (2006.01)
*H01M 10/6556* (2014.01)
(Continued)

(52) U.S. Cl.
CPC ....... *H01M 2/1077* (2013.01); *H01M 10/613* (2015.04); *H01M 10/625* (2015.04); *H01M 10/6556* (2015.04); *H01M 2220/20* (2013.01)

(58) Field of Classification Search
CPC .................................................. H01M 10/6556
See application file for complete search history.

(56) References Cited

U.S. PATENT DOCUMENTS 4,917,684 A 4/1990 Yasumura
7,336,487 B1 2/2008 Chrysler et al.
(Continued)

FOREIGN PATENT DOCUMENTS

KR 101611563 4/2016

*Primary Examiner* — Maria Laios
(74) *Attorney, Agent, or Firm* — David Kelley, Esq.; Carlson, Gaskey & Olds, P.C.

(57) ABSTRACT

An exemplary method includes, among other things, providing first and second blanks that are nominally identical and that include an array of raised features. The method further includes removing a first combination of individual raised features from the first blank to provide a first battery component with a first flow path, and removing a different, second combination of individual raised features from the second blank to provide a second battery component with a different, second flow path. An exemplary battery assembly includes, among other things, a blank having a plurality of ribs extending from a floor. The blank is configured such that a first combination of the ribs are removable from the blank to provide a first battery component having first flow path, and a different, second combination of the ribs are removable from the blank to provide a second battery component having a different, second flow path.

11 Claims, 8 Drawing Sheets

(51) Int. Cl.
*H01M 10/613* (2014.01)
*H01M 10/625* (2014.01)

(56) References Cited

U.S. PATENT DOCUMENTS

| | | | | |
|---|---|---|---|---|
| 8,333,707 | B2 | 12/2012 | Parnagian | |
| 2008/0220323 | A1 | 9/2008 | Corless et al. | |
| 2014/0272508 | A1 | 9/2014 | Musetti | |
| 2015/0144314 | A1 | 5/2015 | Srinivassan et al. | |
| 2016/0036104 | A1* | 2/2016 | Kenney | F28F 3/044<br>429/120 |
| 2016/0372805 | A1* | 12/2016 | Kim | H01M 10/6568 |
| 2017/0001507 | A1 | 1/2017 | Ashraf et al. | |
| 2017/0025651 | A1 | 1/2017 | Baek et al. | |
| 2017/0025721 | A1* | 1/2017 | Moschet | H01M 10/6568 |
| 2017/0288185 | A1 | 10/2017 | Maguire | |

* cited by examiner

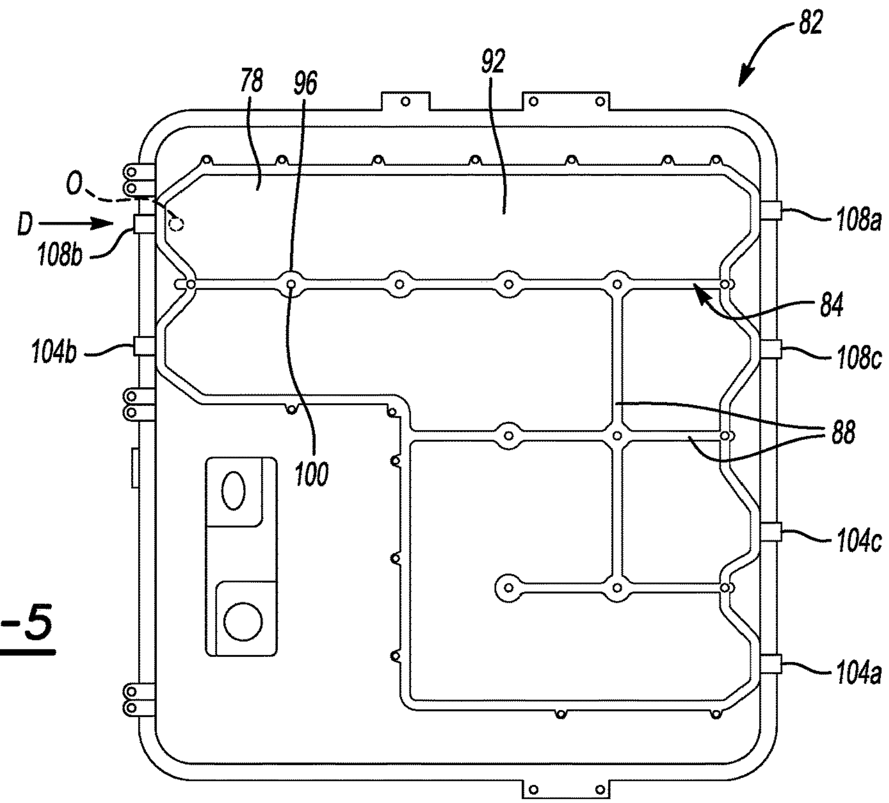
Fig-5
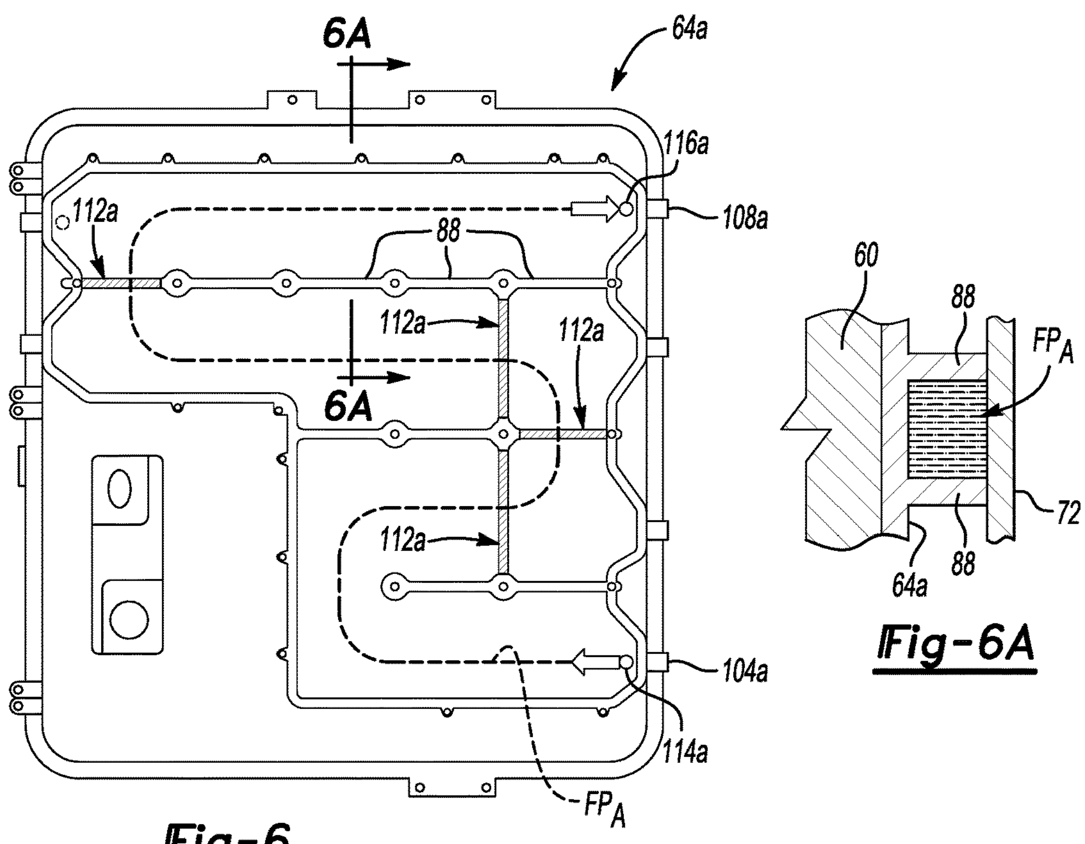
Fig-6
Fig-6A

BATTERY COMPONENT WITH A FLOW PATH

CROSS-REFERENCE TO RELATED APPLICATIONS

This application claims priority to U.S. Provisional Application No. 62/582,540, which was filed on 7 Nov. 2017 and is incorporated herein by reference.

TECHNICAL FIELD

This disclosure relates to a battery pack. More particularly, this disclosure relates to a battery component having a flow path.

BACKGROUND

Electrified vehicles generally differ from conventional motor vehicles because electrified vehicles are selectively driven using one or more electric machines powered by a battery pack. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The battery pack typically includes at least one group of battery cells held within an open area provided by the enclosure. A fluid can communicate through portions of the enclosure that are outside the open area. The fluid can help to manage thermal energy levels, which can improve efficiencies and inhibit undesirable thermal energy buildup. Different electrified vehicles can have different packaging environments for accommodating the battery pack.

SUMMARY

A method according to an exemplary aspect of the present disclosure includes, among other things, providing first and second blanks that are nominally identical and that include an array of raised features. The method further includes removing a first combination of individual raised features from the first blank to provide a first battery component with a first flow path, and removing a different, second combination of individual raised features from the second blank to provide a second battery component with a different, second flow path.

In a further non-limiting embodiment of the foregoing method, the first and second battery components are enclosure trays.

In a further non-limiting embodiment of any of the foregoing methods, each of the individual raised features of the first and second blanks is a rib extending from a respective floor.

In a further non-limiting embodiment of any of the foregoing methods, the first and second battery components are fluid jackets.

In a further non-limiting embodiment of any of the foregoing methods, each of the individual raised features of the first and second blanks is a rib extending from a respective floor.

In a further non-limiting embodiment of any of the foregoing methods, the first flow path extends from a first flow path inlet to a first flow path outlet, and the second flow path extends from a second flow path inlet to a second flow path outlet. A position of the first flow path inlet within the first battery component is different than a position of the second flow path inlet within the second battery component. Alternatively, or in addition, a position of the first flow path outlet within the first battery component is different than a position of the second flow path outlet within the second battery component.

A further non-limiting embodiment of any of the foregoing methods includes machining openings within respective bosses of the first blank to provide the first flow path inlet and the first flow path outlet, and machining openings within respective bosses of the second blank to provide the second flow path inlet and the second flow path outlet. The first and second blanks are nominally identical prior to the removing and prior to the machining.

In a further non-limiting embodiment of any of the foregoing methods, the first flow path has a circumferential perimeter established entirely by the first battery component and a fluid jacket, or established entirely by the first battery component and an enclosure tray. The second flow path has a circumferential perimeter defined entirely by the second battery component and the fluid jacket, or established entirely by the second battery component and the enclosure tray.

In a further non-limiting embodiment of any of the foregoing methods, the removing the combinations of raised features from the first and second blanks comprises machining away material from the first and second blanks.

A further non-limiting embodiment of any of the foregoing methods includes moving fluid through the first flow path to exchange thermal energy with an array of traction battery cells having a first configuration, and moving fluid through the second flow path to exchange thermal energy with an array of traction battery cells having a different, second configuration.

In a further non-limiting embodiment of any of the foregoing methods, prior to the removing, the array of raised features is a grid of the raised features disposed on a floor of the first and second blanks.

A method according to another exemplary aspect of the present disclosure includes, among other things, casting a first battery component within a die cavity when a plurality of slides are in a first configuration to provide the first battery component with a first flow path, removing the first battery component from the die cavity, and casting a second battery component within the die cavity with the plurality of slides in a different, second configuration to provide the second battery component with a different, second flow path.

In a further non-limiting embodiment of the foregoing method, the first flow path extends from an opening in first flow path inlet boss to an opening in first flow path outlet boss, and the second flow path extends from an opening in a second flow path inlet boss to an opening in a second flow path outlet boss. A position of the first flow path inlet boss within the first battery component is different than a position of the second flow path inlet boss within the second battery component. A position of the first flow path outlet boss within the first battery component is different than a position of the second flow path outlet boss within the second battery component, or both.

A battery assembly according to an exemplary aspect of the present disclosure includes, among other things, a blank having a plurality of ribs extending from a floor. The blank is configured such that a first combination of the ribs are removable from the blank to provide a first battery component having first flow path, and a different, second combination of the ribs are removable from the blank to provide a second battery component having a different, second flow path.

In a further non-limiting embodiment of the foregoing assembly, the first flow path is configured to communicate fluid to exchange thermal energy with an array of traction battery cells having a first configuration, and the second flow path is configured to communicate fluid to exchange thermal energy with an array of traction battery cells having a different, second configuration.

In a further non-limiting embodiment of any of the foregoing assemblies, the blank is an enclosure tray blank.

In a further non-limiting embodiment of any of the foregoing assemblies, the blank is a fluid jacket blank.

In a further non-limiting embodiment of any of the foregoing assemblies, the first flow path has a circumferential perimeter established entirely by the first battery component and a fluid jacket, or established entirely by the first battery component and an enclosure tray. The second flow path has a circumferential perimeter defined entirely by the second battery component and the fluid jacket, or established entirely by the second battery component and the enclosure tray.

In a further non-limiting embodiment of any of the foregoing assemblies, the first flow path extends from a first flow path inlet to a first flow path outlet, and the second flow path extends from a second flow path inlet to a second flow path outlet. The first flow path inlet and the second flow path inlet are located at different locations within the blank.

A method according to yet another exemplary aspect of the present disclosure includes, among other things, placing a seal having a first pattern between a first fluid jacket and a first enclosure tray to provide a first flow path, and placing a seal having a different, second pattern between a second fluid jacket and a second enclosure tray to provide a different, second flow path. The first and second enclosure trays are nominally identical.

DESCRIPTION OF THE FIGURES

The various features and advantages of the disclosed examples will become apparent to those skilled in the art from the detailed description. The figures that accompany the detailed description can be briefly described as follows:

FIG. 5 illustrates a bottom view of the blank of FIG. 4.

FIG. 6 illustrates an enclosure tray for use in the battery pack of FIG. 2 that is formed from the blank of FIG. 4 according to an exemplary aspect of the present disclosure.

FIG. 6A illustrates a section view at line 6A-6A in FIG. 6.

DETAILED DESCRIPTION

This disclosure relates to an enclosure for a battery pack of an electrified vehicle. The enclosure includes portions formed from a blank. Areas of the blank are adjusted to provide the enclosure with various flow paths for circulating a fluid. The adjustments can include machining away areas of the blank to provide a first flow path, or machining away other areas of the blank to provide a different, second flow path.

Figure 1:
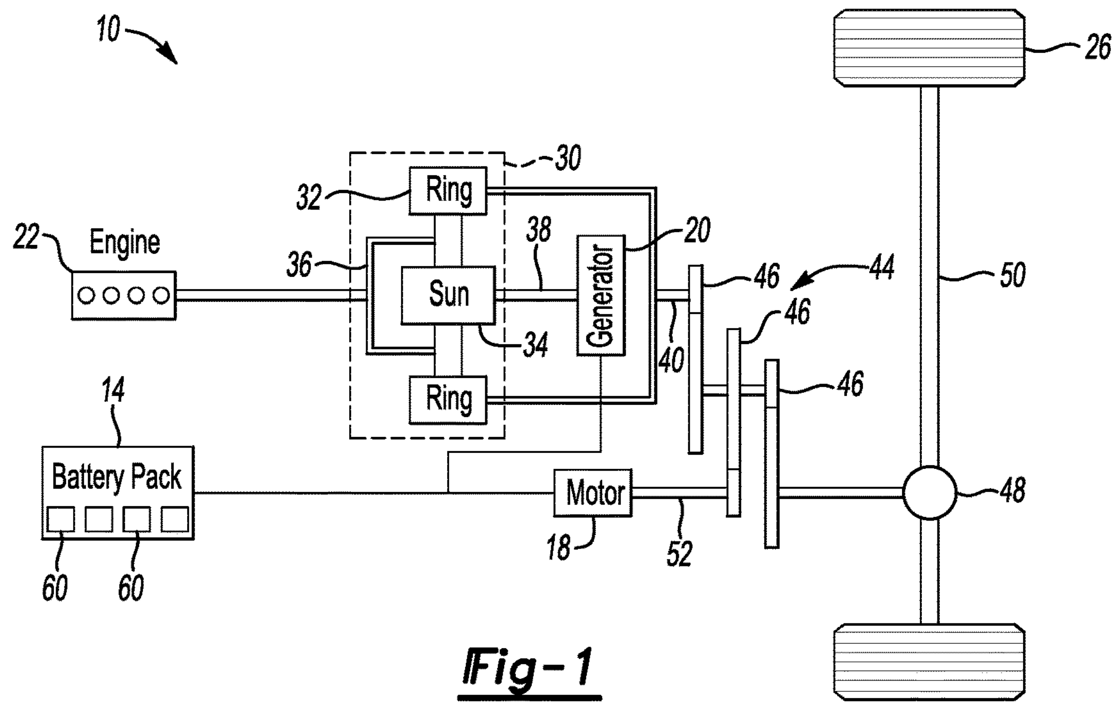
FIG. 1 illustrates a schematic view of a powertrain of an electrified vehicle.

FIG. 1 schematically illustrates a powertrain 10 for an electrified vehicle, which is a hybrid electric vehicle (HEV) in this example. Although depicted as an HEV, it should be understood that the concepts described herein are not limited to HEVs and could extend to other types of electrified vehicle, including, but not limited to, plug-in hybrid electric vehicles (PHEVs), battery electric vehicles (BEVs), fuel cell vehicles, etc.

The powertrain 10 includes a battery pack 14, a motor 18, a generator 20, and an internal combustion engine 22. The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electrified vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, could be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable.

The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14. The battery pack 14 can include arrays of battery cells 60 within an enclosure assembly.

Figure 2:
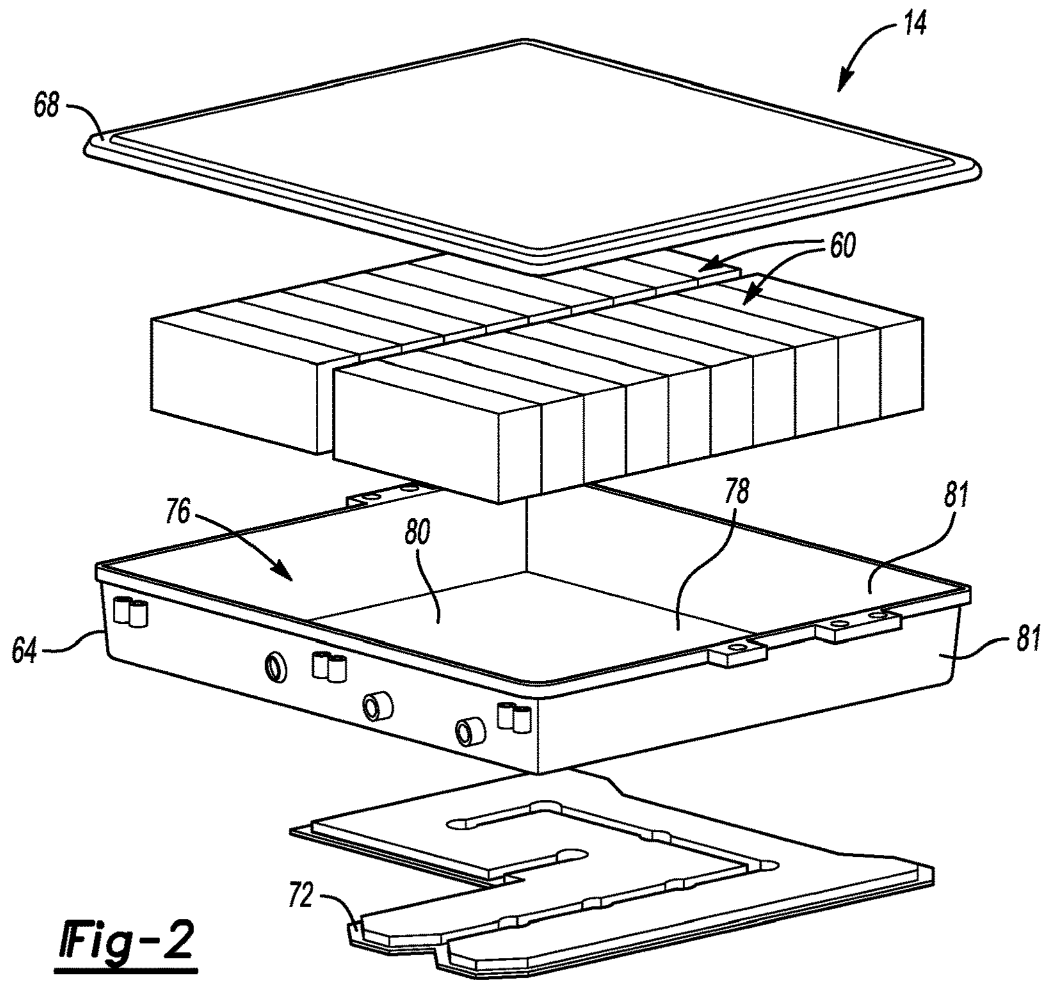
FIG. 2 illustrates an expanded view of a battery pack from the powertrain of FIG. 1.
Figure 3:
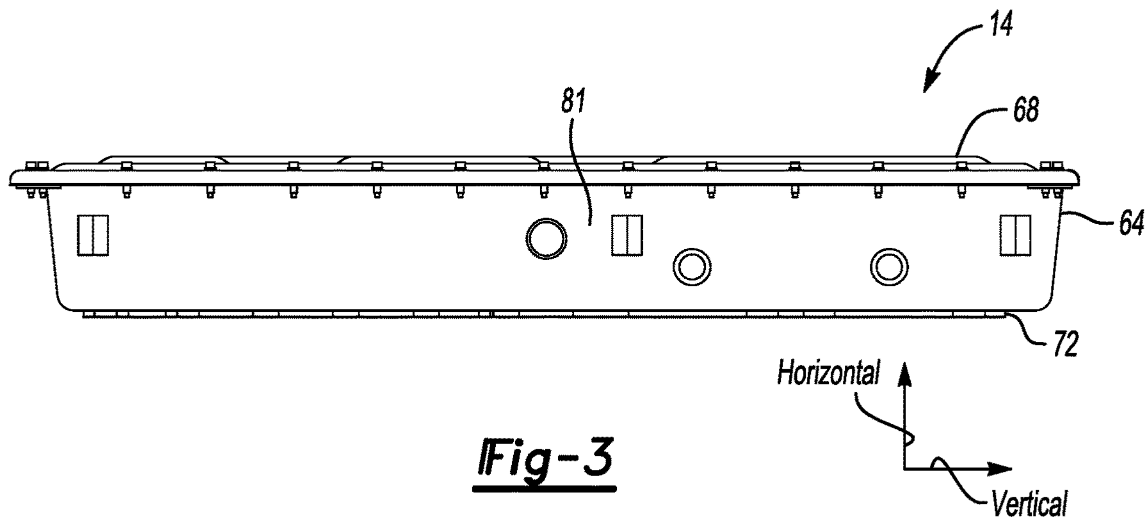
FIG. 3 illustrates a side view of the battery pack from FIG. 2 when assembled.

Referring now to FIGS. 2 and 3, the battery pack 14, according to an exemplary aspect of the present disclosure, includes an enclosure assembly that includes various battery components, here an enclosure tray 64, a cover 68, and a fluid jacket 72.

The battery cells 60 can be placed within an open area 76 of the enclosure tray 64. The cover 68 can then be secured to the enclosure tray 64 to enclose the battery cells 60 within the open area 76. When the battery cells 60 are within the open area 76, the battery cells 60 are disposed upon a surface 78 of a floor 80 of the enclosure tray 64. Walls 81 of the enclosure tray 64 extend from the floor 80 to the cover 68.

The battery pack 14 circulates a fluid along a surface of the floor 80 opposite the surface 78. The fluid can exchange, through the floor 80, thermal energy with the battery cells 60. The fluid is outside the open area 76, and moves along a flow path provided by the enclosure tray 64 and covered by the fluid jacket 72. The fluid can move to the battery pack 14 from a fluid supply, and then circulate through the fluid path to take on thermal energy. The fluid can move from the fluid path to a heat exchanger, for example, where the fluid releases the thermal energy. The fluid can then move back to the fluid supply. The fluid can be liquid. In a specific example, the fluid is liquid water.

The enclosure tray 64, the fluid jacket 72, or both, can be modified to provide different fluid paths. Different fluid paths could be desired to accommodate different configurations of battery cells 60, or to facilitate positioning of inlets and outlets to the flow path in certain areas.

FIG. 3 shows the battery pack 14 in an orientation when installed within a vehicle. Vertical is with reference to ground and the normal orientation of a vehicle during operation.

Figure 4:
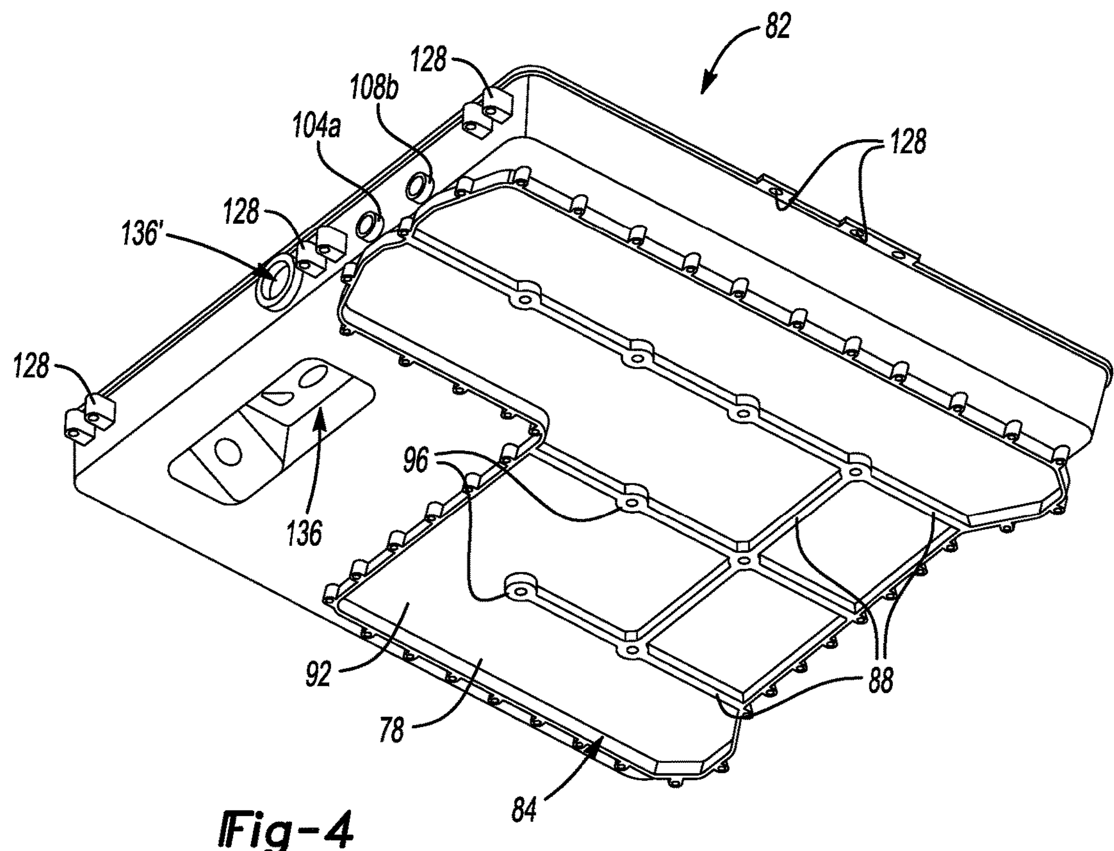
FIG. 4 illustrates a perspective view of an enclosure tray blank that can be modified to provide an enclosure tray of the battery pack of FIG. 2.

With reference now to FIGS. 4 and 5, and continuing reference to FIGS. 2 and 3, the enclosure tray 64 is formed from a blank 82. The blank 82 can be a cast or formed from some other manufacturing technique. The blank 82 can be, for example, a polymer-based material, a metal, or metal alloy. In a specific exemplary embodiment, the blank 82 is aluminum.

The blank 82 includes an array 84 of raised features 88. The raised features 88, in the exemplary embodiment, are ribs extending away from a surface 92 of the floor 80. The raised features 88 are arranged in a gridded pattern. The raised features 88 can connect to each other at interfaces 96. The interfaces 96, in this example, include an aperture 100. When the blank 82 is modified into the enclosure tray 64, the apertures 100 can each receive a mechanical fastener that holds the fluid jacket 72 to the enclosure tray 64.

To provide the enclosure tray 64 from the blank 82, selected individual raised features 88 can be removed from the blank 82. Removing selected raised features 88 establishes a desired flow path within the enclosure tray 64. That is, as will be shown, a first combination of the individual raised features 88 can be removed from the blank 82 to provide the enclosure tray 64 with a first flow path, and a different, second combination of individual raised features 88 can be removed from the blank 82 to provide the enclosure tray 64 with a different, second flow path. Raised features 88 that are not removed block flow through the flow path. Fluid can pass between the floor 80 and the fluid jacket 72 in areas where the raised features 88 have been removed.

Although the raised features 88 are part of the enclosure tray 64 in this example, another example could include some or all of the raised features extending from the fluid jacket 72, which is another type of battery component, toward the floor 80.

The blank 82 is also formed with a plurality of inlet bosses 104*a*, 104*b*, and 104*c*, and a plurality of outlet bosses 108*a*, 108*b*, and 108*c*. Depending on the desired flow path within the enclosure tray 64, one or more of the inlet bosses 104*a*-104*c* can be machined to provide an inlet to the flow path, and one or more of the outlet bosses 108*a*-108*c* can be machined to provide an outlet from the flow path. Couplings and fittings can then be connected to the bosses to convey a coolant, for example, to and from the fluid path of the enclosure tray 64. Machining the bosses can include tapping the bosses to provide a threaded aperture for attaching couplings, fittings, etc.

For example, with reference to the outlet boss 108*a* and FIG. 5, a drilling operation could be used to create a conduit initially extending through the outlet boss 108 in a direction D, and then extending a direction perpendicular to the plane of the page in FIG. 5 to an opening O in the surface 92. Within the enclosure tray 64, such a conduit provides a passage through the outlet boss 108 for communicating fluid from the flow path.

While the inlet bosses 104*a*-104*c* are described as separate from the outlet bosses 108*a*-108*c*, some fluid path configurations could utilize one of the bosses designated as the inlet bosses 104*a*-104*c* as an outlet from the fluid path, and one or more of the bosses designated as an outlet boss 108*a*-108*c* as an inlet to the fluid path.

Referring to FIG. 6, the blank 82 has been modified to provide an enclosure tray 64*a* having a fluid path $FP_A$ of a first configuration. To provide the enclosure tray 64*a*, raised features 88 have been removed from areas 112*a*, an aperture 114*a* has been established that extends through the inlet boss 104*a* to the fluid path $FP_A$, and an aperture 116*a* has been established that extends through the outlet boss 108*a* to the fluid path $FP_A$. After securing the fluid jacket 72 to the enclosure tray 64*a*, fluid can communicate along a fluid path $FP_A$ to, for example, cool the battery cells and other components.

As shown in FIG. 6A, the fluid path $FP_A$, within an assembled battery pack incorporating the enclosure tray 64*a*, has a circumferential perimeter established entirely by the enclosure tray 64*a* and the fluid jacket 72.

Figure 7:
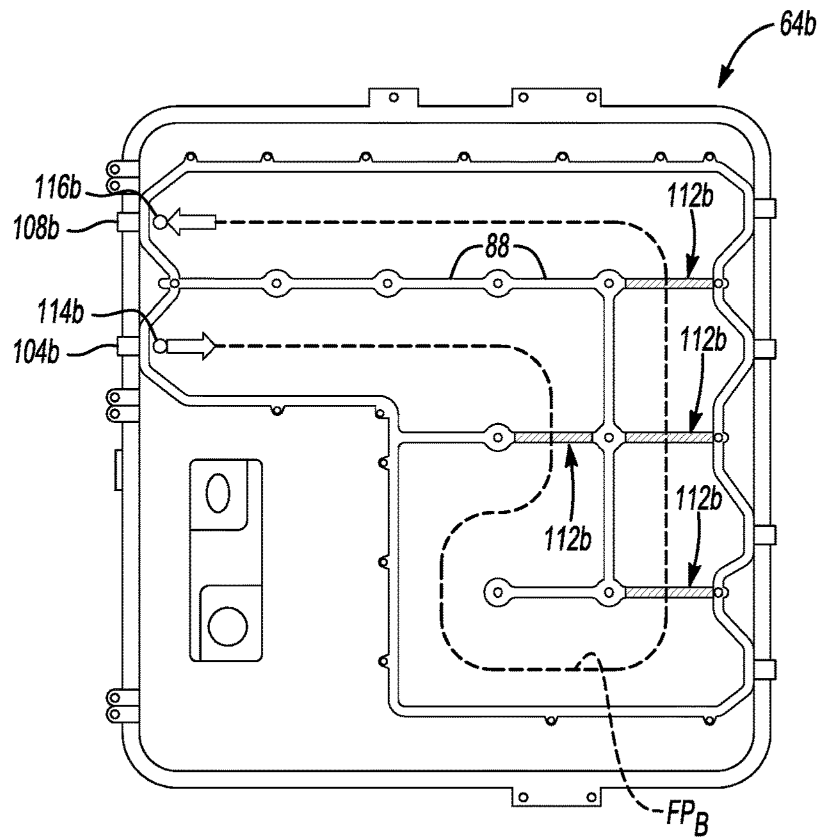
FIG. 7 illustrates an enclosure tray for use in the battery pack of FIG. 2 that is formed from the blank of FIG. 4 according to another exemplary aspect of the present disclosure.

Referring now to FIG. 7, the blank 82 has been modified to provide an enclosure tray 64*b* having a fluid path $FP_B$ of a second configuration. To provide the enclosure tray 64*b*, raised features 88 have been removed from areas 112*b*, an aperture 114*b* has been established that extends through the inlet boss 104*b* to the fluid path $FP_B$, and an aperture 116*b* has been established that extends through the outlet boss 108*b* to the fluid path $FP_B$. After securing the fluid jacket 72 to the enclosure tray 64*b*, fluid can communicate along a fluid path $FP_B$ to, for example, cool the battery cells and other components.

Figure 8:
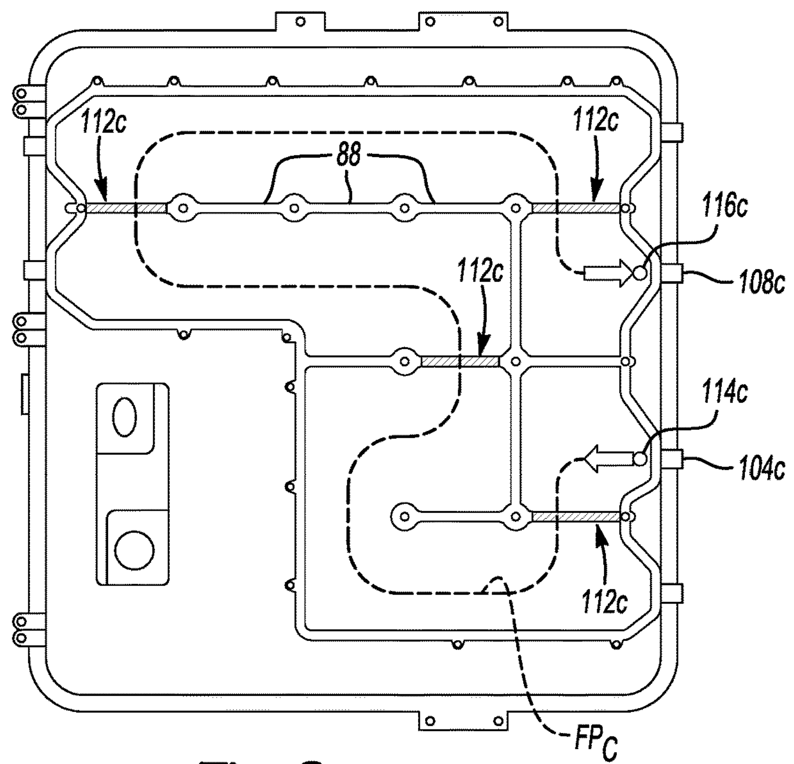
FIG. 8 illustrates an enclosure tray for use in the battery pack of FIG. 2 that is formed from the blank of FIG. 4 according to another exemplary aspect of the present disclosure.

Referring now to FIG. 8, the blank 82 has been modified to provide an enclosure tray 64*c* having a fluid path $FP_C$ of a third configuration. To provide the enclosure tray 64*c*, raised features 88 have been removed from areas 112*c*, an aperture 114*c* has been established that extends through the inlet boss 104*c* to the fluid path $FP_C$, and an aperture 116*c* has been established that extends through the outlet boss 108*c* to the fluid path $FP_C$. After securing the fluid jacket 72 to the enclosure tray 64*c*, fluid can communicate along a fluid path $FP_C$ to, for example, cool the battery cells and other components.

Figure 9:
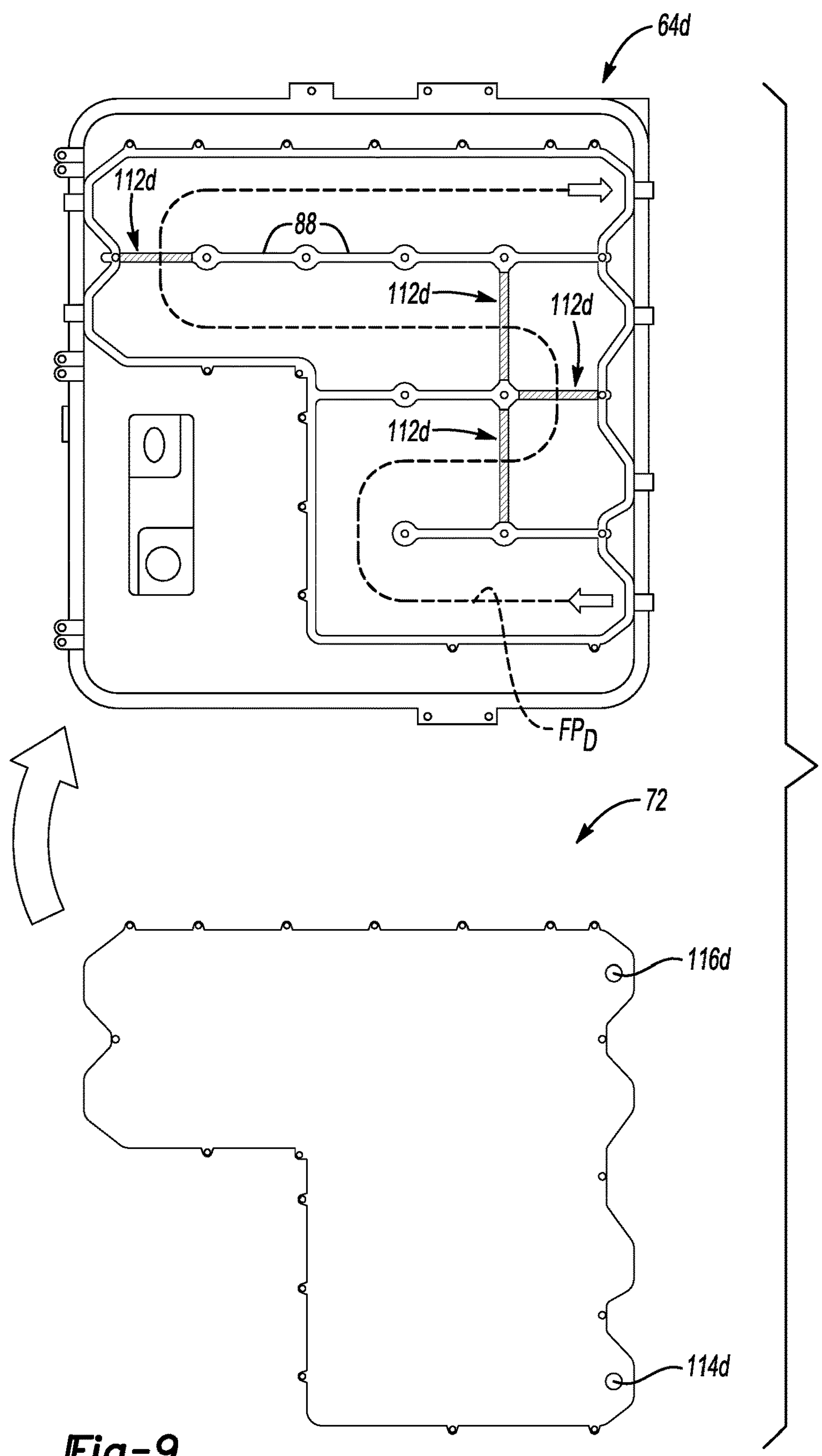
FIG. 9 illustrates an enclosure tray for use in the battery pack of FIG. 2 that is formed from the blank of FIG. 4 according to another exemplary aspect of the present disclosure, along with a fluid jacket.

Referring now to FIG. 9, the blank 82 has been modified to provide an enclosure tray 64*d* having a fluid path $FP_D$ of a fourth configuration. To provide the enclosure tray 64*d*, raised features 88 have been removed from areas 112*c*, an aperture 114*d* established in the fluid jacket 72 conveys fluid to the fluid path $FP_D$, and an aperture 116*d* established in the fluid jacket 72 conveys fluid from the fluid path $FP_D$. After securing the fluid jacket 72 to the enclosure tray 64*b*, fluid can communicate along a fluid path $FP_D$ to, for example, cool the battery cells and other components. In the exemplary embodiment of FIG. 9, the inlet bosses 104*a*-104*c* and the outlet bosses 108*a*-108*c* remain unapertured.

As shown in FIGS. 6-9, the flow paths $FP_A$-$FP_D$ can provide battery packs with differing locations for inlets to the flow paths, and for outlets from the flow paths. The flow paths $FP_A$-$FP_D$ are established within the enclosure trays 64*a*-64*d*, which can all be formed from a common blank. Depending on, among other things, a desired packaging location for inlets and outlets to flow paths within a vehicle, the blank 82 can be modified to provide the enclosure tray 64*a*-64*d* with the desired inlet and outlet locations, and the desired flow path.

Removing the raised features 88 to provide the desired flow path $FP_A$-$FP_D$ within the embodiments of FIGS. 6-9 can involve machining away the ribs from the blank 82. Prior to modifying the blank 82 to remove the raised features 88 and to create the inlets and outlets, the blanks 82 used to create the enclosure trays 64*a*-64*d* are nominally identical. Nominally identical, for purposes of this disclosure means that the blanks mimic each other dimensionally. While surface imperfections may cause slight differences, the blanks can still be nominally identical to each other. Nominally identical blanks can refer to blanks manufactured using common tooling and processes.

With reference again to FIGS. 1 and 4, the blank 82 can be provided to include anchoring tabs 128 used in connection with brackets and mechanical fasteners, for example, to attach the enclosure tray 64 to the vehicle. The anchoring tabs 128 used can be selected based on how the battery pack 14 will be packaged within the vehicle. If an anchoring tab 128 is not required, the anchoring tab 128 can be removed by machining. That is, features of the blank 82 can be machined off if the desired application does not required those features.

The blank 82 can also be provided to include bosses 136 and 136' representing potential electrical connection locations. If, for example, the electrical connections to the battery pack 14 are desired on a downwardly facing surface, an aperture can be machined in the boss 136, while the boss 136' remains unapertured. If instead, the electrical connections to the battery pack 14 are desired to pass through a laterally facing surface of the battery pack 14, an aperture can be machined in the boss 136', while the boss 136 remains unapertured.

Figure 10:
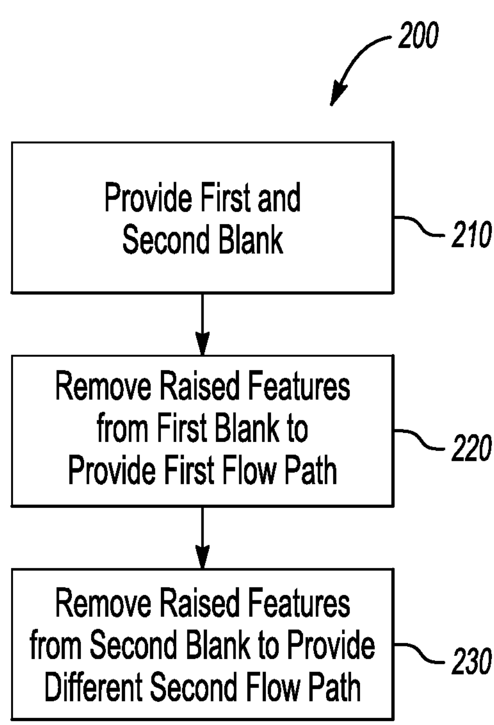
FIG. 10 illustrates the flow of an example method of providing battery components having different flow paths using a common blank.

With reference now to FIG. 10, an example method 210 of providing battery components having different flow paths using a common blank begins at a step 210 where first and second blanks that are nominally identical are provided. The first and second blanks include an array of raised features. At a step 220, the method 200 includes removing a first combination of individual raised features from the first blank to provide a first battery component with a first flow path. At a step 230, the method 200 includes removing a different, second combination of individual raised features from the second blank to provide a second battery component with a different, second flow path.

Figure 11A:
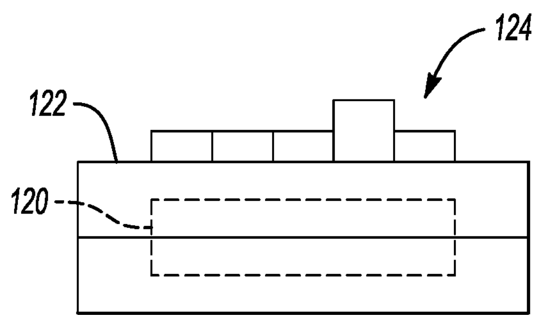
FIG. 11A illustrates a die and sliders in a first configuration that are used to cast an enclosure tray according to yet another exemplary embodiment of the present disclosure.
Figure 11B:
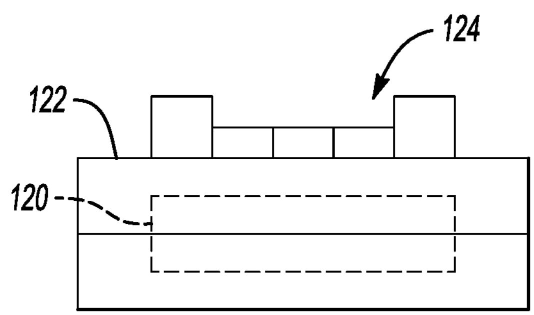
FIG. 11B illustrates a die and sliders in a different, second configuration that are used to cast an enclosure tray according to yet another exemplary embodiment of the present disclosure.

In other exemplary aspect of the present disclosure, the enclosure tray 64 can be cast within a die cavity 120 of a die 122 with sliders 124 positioned in a first configuration as shown in FIG. 11A to cause the enclosure tray 64 be cast with raised features 88 in desired locations while omitting raised features 88 from other locations. If an alternatively configured flow path within the enclosure tray 64 is desired, the same die cavity 120 can be used to provide the enclosure tray 64, but the sliders 124 can be placed in a different configuration as shown in FIG. 11B to cause raised features 88 to be formed in desired locations and omitted from other locations.

With reference again to FIGS. 6-9, the raised features 88 in the enclosure tray 64*a*-64*d* that have not been removed can directly contact the fluid jacket 72 when the fluid jacket 72 is secured to the respective enclosure tray 64*a*-64*d*. The direct contact between the raised features 88 and the fluid jacket 72 can block fluid from passing through areas between the raised features 88 and the fluid jacket 72. In some examples, the raised features 88 are received within a groove of the fluid jacket 72 to enhance direct contact. While some fluid could potentially leak through these areas, the leaking should be quite minor and not have a significant effect on fluid flow or cooling effectiveness as the fluid would tend to follow the path of least resistance. Again, while the raised feature 88 are shown as part of the enclosure trays 64*a*-64*d*, other examples could include raised features from the fluid jacket 72 that extend to, and may directly contact, the respective enclosure tray 64*a*-64*d*.

Interfaces between the fluid jacket 72 and the associated enclosure tray 64*a*-64*d* could be sealed in other ways. For example, the fluid jacket 72 could be welded to the associated enclosure tray 64*a*-64*d*, particularly about a periphery of the fluid jacket 72. A number of welding techniques could be used, including metal inert gas (MIG), tungsten inert gas (TIG), laser, friction stir welding, or others. Some welding techniques, such as friction stir welding (FSW), could also be used to weld the raised features 88, located on the respective enclosure tray 64*a*-64*d* to the fluid jacket 72.

Figure 12:
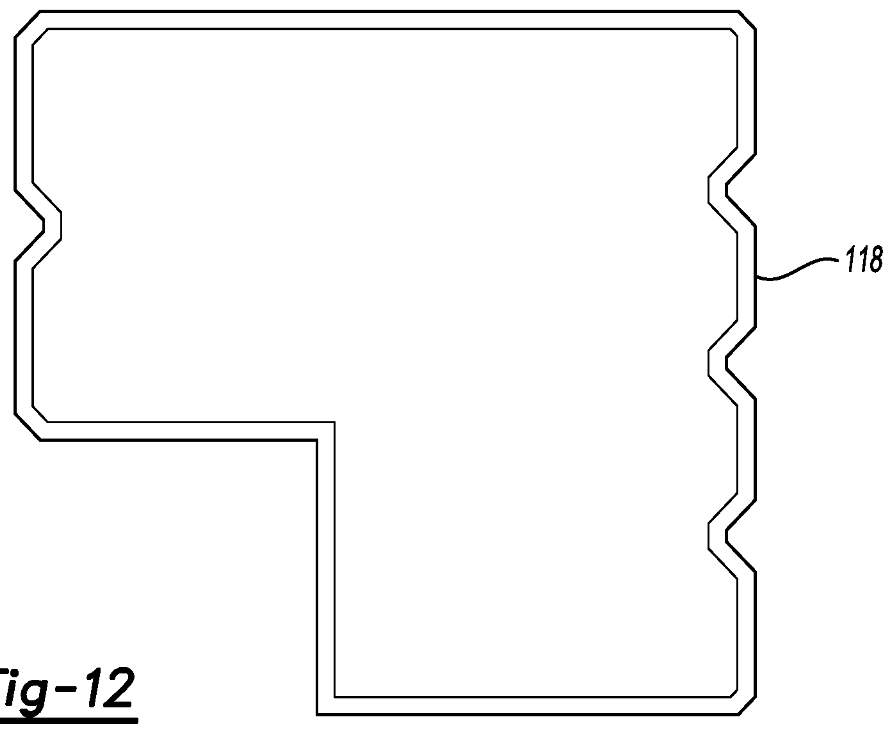
FIG. 12 illustrates a perimeter seal for use in the battery pack of FIG. 2 according to an exemplary embodiment of the present disclosure.

With reference to FIGS. 2 and 12, another technique could include using a perimeter seal 118 positioned about the perimeter of the fluid flow paths $FP_A$-$FP_C$ where the fluid jacket 72 interfaces with the respective tray 64*a*-64*d*. The perimeter seal 118 could be a mechanical gasket, a pip seal, pumpable foam, a sealant, or a variety of other seal types.

Yet another technique could include using a curable sealant to bond the fluid jacket 72 to the respective enclosure trays 64*a*-64*d* of the FIGS. 6-9 embodiments where the fluid jacket 72 interfaces with the respective enclosure tray 64*a*-64*d* Like the exemplary welding techniques or the perimeter seal, the sealant could extend along a periphery of the fluid jacket 72. The sealant could instead, or additionally, extend along interfaces between the raised features 88 and the fluid jacket 72 or the enclosure tray 64*a*-64*d*.

Figure 13A:
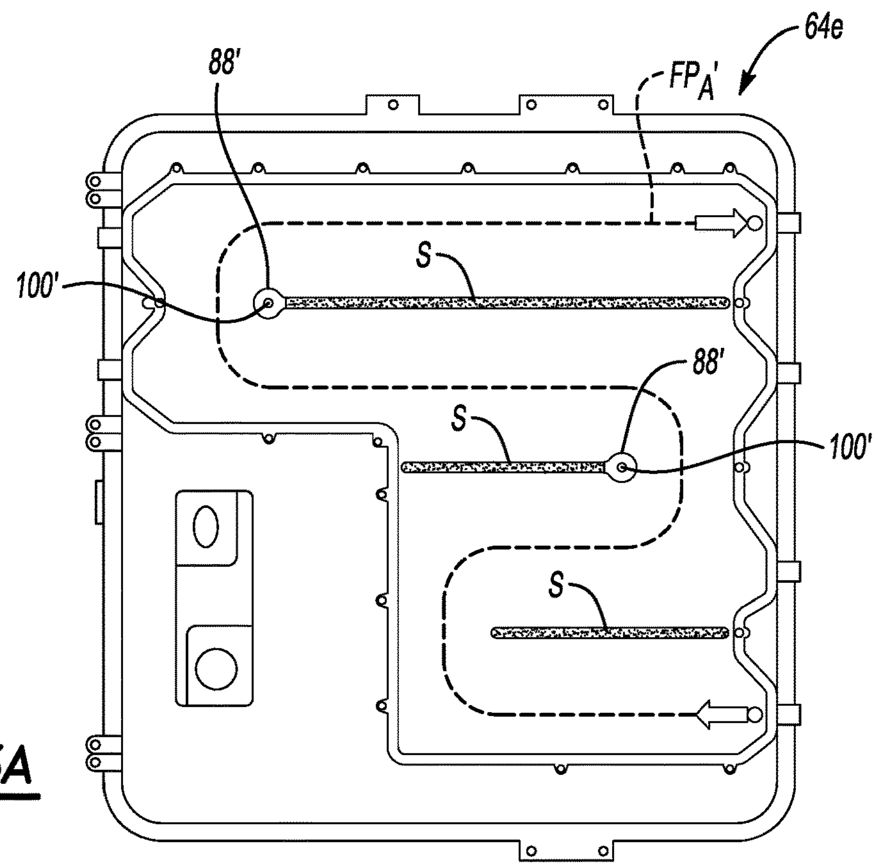
FIG. 13A illustrates an enclosure tray for use in the battery pack of FIG. 2 using a seal having a first pattern to provide a flow path according to another exemplary aspect of the present disclosure.

Notably, in some exemplary embodiments, a seal could be used in place of the raised features 88 to establish various flow paths to direct the fluid flow. For example, with reference to FIGS. 13A-13C, a base casting of a tray 64*e* could omit at least some of the raised features 88 (FIG. 5) within the tray 64*e* used to define flow paths. In place of the raised features 88, a seal S could be deposited on the tray 64*e* in a first pattern, as shown in FIG. 13A, to provide a flow path $FP_A$'. The fluid jacket 72 is then secured to the tray 64*e* at least partially by the seal S. If the seal S is an adhesive, curable seal the fluid jacket 72 could be secured relative to the tray 64*e* as the seal S cures. A fixture, clamps, fasteners, or some combination of these could be used to secure the fluid jacket 72 relative to the tray 64*e* while the seal S cures.

Figure 13B:
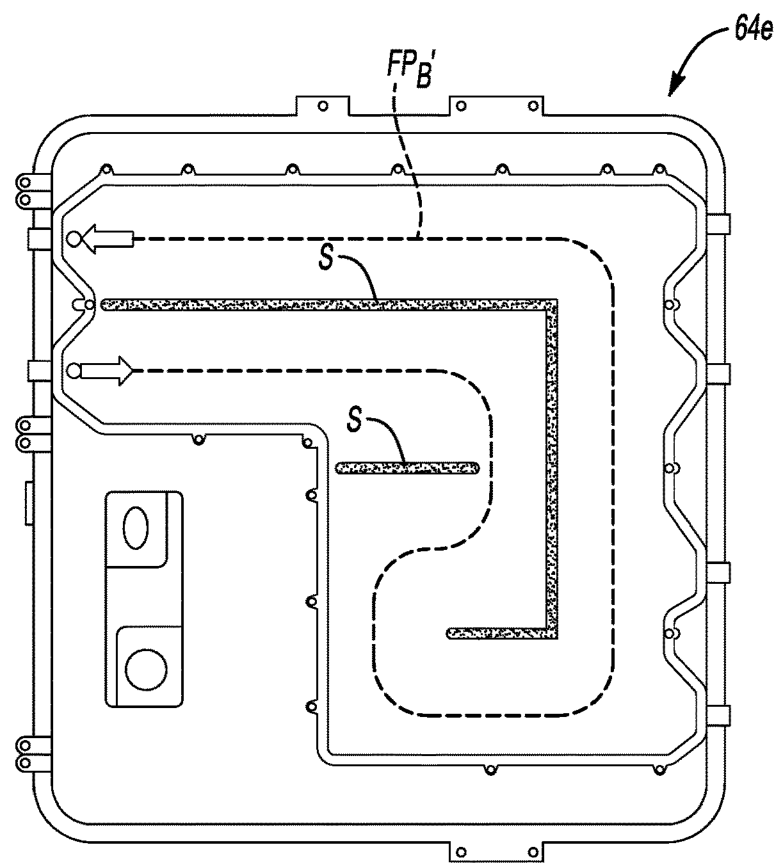
FIG. 13B illustrates an enclosure tray for use in the battery pack of FIG. 2 using a seal having a second pattern to provide a flow path according to another exemplary aspect of the present disclosure.
Figure 13C:
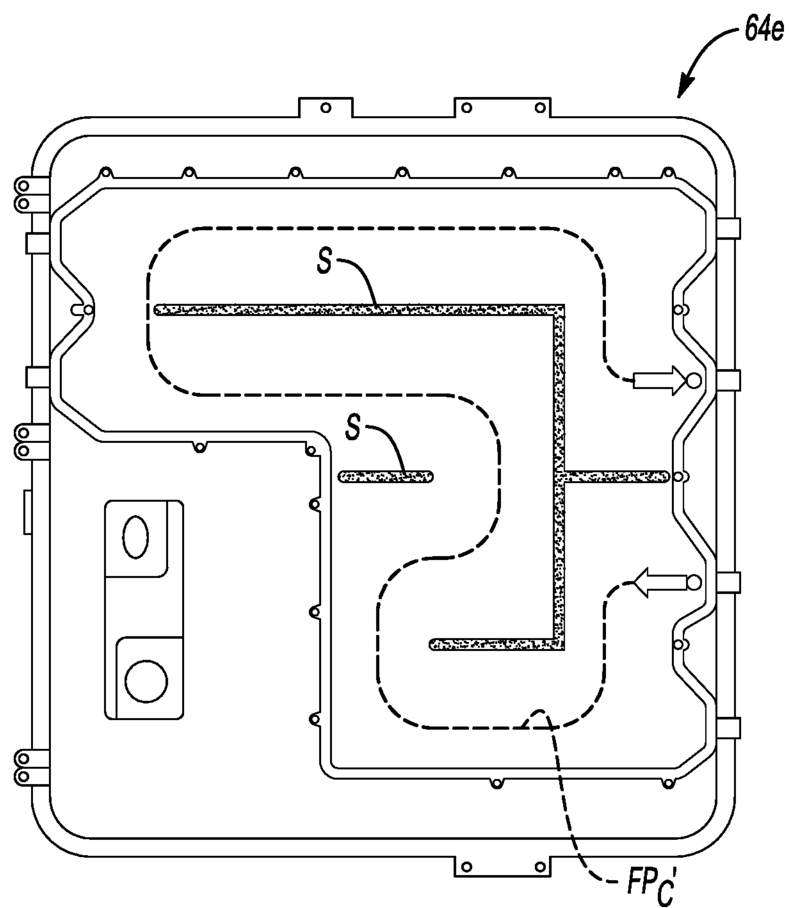
FIG. 13C illustrates an enclosure tray for use in the battery pack of FIG. 2 using a seal having a third pattern to provide a flow path according to another exemplary aspect of the present disclosure.

The seal S could instead be placed according to a second pattern, as shown in FIG. 13B, to provide a flow path $FP_B$'. Seal S could instead be placed according to a third pattern, as shown in FIG. 13C, to provide a flow path $FP_C$'. As can be appreciated, various other patterns of the seal S could be utilized to provide various other flow path configurations. Also, although shown as being deposited on the tray 64*e*, the seal S could instead be deposited on the fluid jacket 72. Further, the seal S could be used in combination with at least some ribs 88 (FIG. 5) to provide a desired flow path.

With reference again to FIG. 13A, the embodiments utilizing seal S to provide flow paths and to secure the fluid jacket 72 to the tray 64*e* could include some raised features 88'. The raised features 88' could be in the tray 64*e*, the fluid jacket 72 that is secured to the tray 64*e*, or both. The raised features 88' can include apertures 100' can each receive a mechanical fastener that helps to holds the fluid jacket 72 to the tray 64. O-ring seals can extend about the apertures 100' to seal interfaces between the raised features 88' and the fluid jacket 72 of the tray 64*e*.

Features of the examples of the disclosed embodiment include utilizing common tooling to provide battery components having different flow paths. A blank can be used to provide features for supporting many packaging environments. This approach can reduce engineering time, among other things. That is, there is no need to substantially reengineer and design a unique battery pack for various packaging environments. This approach can also reduce piece cost by sharing the same basic blank for a battery component across multiple vehicles.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A method, comprising:

providing first and second blanks that are nominally identical and that include an array of raised features;

removing a first combination of individual raised features from the first blank to provide a first battery component with a first flow path; and removing a different, second combination of individual raised features from the second blank to provide a second battery component with a different, second flow path.

2. The method of claim 1, wherein the first and second battery components are enclosure trays.

3. The method of claim 2, wherein each of the individual raised features of the first and second blanks is a rib extending from a respective floor.

4. The method of claim 1, wherein the first and second battery components are fluid jackets.

5. The method of claim 4, wherein each of the individual raised features of the first and second blanks is a rib extending from a respective floor.

6. The method of claim 1, wherein the first flow path extends from a first flow path inlet to a first flow path outlet, and the second flow path extends from a second flow path inlet to a second flow path outlet, wherein a position of the first flow path inlet within the first battery component is different than a position of the second flow path inlet within the second battery component, wherein a position of the first flow path outlet within the first battery component is different than a position of the second flow path outlet within the second battery component, or both.

7. The method of claim 6, further comprising machining openings within respective bosses of the first blank to provide the first flow path inlet and the first flow path outlet; and machining openings within respective bosses of the second blank to provide the second flow path inlet and the second flow path outlet, the first and second blanks nominally identical prior to the removing and prior to the machining.

8. The method of claim 1, wherein the first flow path has a circumferential perimeter established entirely by the first battery component and a fluid jacket, or established entirely by the first battery component and an enclosure tray, wherein the second flow path has a circumferential perimeter defined entirely by the second battery component and the fluid jacket, or established entirely by the second battery component and the enclosure tray.

9. The method of claim 1, wherein removing the combinations of raised features from the first and second blanks comprises machining away material from the first and second blanks.

10. The method of claim 1, further comprising moving fluid through the first flow path to exchange thermal energy with an array of traction battery cells having a first configuration, and moving fluid through the second flow path to exchange thermal energy with an array of traction battery cells having a different, second configuration.

11. The method of claim 1, wherein, prior to the removing, the array of raised features is a grid of the raised features disposed on a floor of the first and second blanks.

* * * * *